US010083170B2

(12) United States Patent
Chowdhury et al.

(10) Patent No.: US 10,083,170 B2
(45) Date of Patent: Sep. 25, 2018

(54) HYBRID APPROACH FOR SHORT FORM DETECTION AND EXPANSION TO LONG FORMS

(71) Applicant: International Business Machines Corporation, Armonk, NY (US)

(72) Inventors: Md Faisal M. Chowdhury, White Plains, NY (US); Michael R. Glass, Bayonne, NJ (US); Alfio M. Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/195,442

(22) Filed: Jun. 28, 2016

(65) Prior Publication Data
US 2017/0371857 A1  Dec. 28, 2017

(51) Int. Cl.
*G06F 17/27* (2006.01)
*G06F 17/22* (2006.01)

(52) U.S. Cl.
CPC ........ *G06F 17/277* (2013.01); *G06F 17/2211* (2013.01); *G06F 17/2725* (2013.01); *G06F 17/2785* (2013.01)

(58) Field of Classification Search
CPC .................................................. G06F 17/277
USPC ........................................................ 715/256
See application file for complete search history.

(56) References Cited

U.S. PATENT DOCUMENTS

| 4,459,049 A | 7/1984 | Howell et al. |
| 4,777,596 A | 10/1988 | Shaffer et al. |
| 6,385,629 B1* | 5/2002 | Sundaresan ....... G06F 17/30539 707/999.006 |
| 7,028,038 B1* | 4/2006 | Pakhomov ............ G06F 17/277 704/275 |
| 7,136,876 B1* | 11/2006 | Adar ................... G06F 17/2735 |

(Continued)

OTHER PUBLICATIONS

Mitchell, Machine Learning, 1997, McGraw-Hill, p. 154-200. (Year: 1997).*

(Continued)

*Primary Examiner* — Frank D Mills
(74) *Attorney, Agent, or Firm* — Pepper Hamilton LLP (57) ABSTRACT

Embodiments provide a system and method for short form and long form detection. Given candidate short forms, the system can generate one or more n-gram combinations, resulting in one or more candidate short form and n-gram combination pairs. For each candidate short form and n-gram combination pair, the system can calculate an approximate string matching distance, calculate a best possible alignment score, calculate a confidence score, calculate a topic similarity score, and calculate a semantic similarity score. The system can determine the validity, through a meta learner, of the one or more valid candidate short form and n-gram combination pairs based upon each short form and n-gram combination pair's confidence score, topic similarity score, and semantic similarity score, and store the valid short form and n-gram combination pairs in a repository. The system has no language specific constraints and can extract short form and long form pairs from documents written in various languages. The system is also not limited to whether the language of the given corpus is case sensitive or not.

19 Claims, 4 Drawing Sheets

(56) References Cited

U.S. PATENT DOCUMENTS

| | | | |
|---|---|---|---|
| 7,236,923 B1* | 6/2007 | Gupta | G06F 17/277 704/7 |
| 7,689,540 B2 | 3/2010 | Chowdhury et al. | |
| 7,788,276 B2 | 8/2010 | Peng et al. | |
| 8,498,999 B1 | 7/2013 | Bhalotia | |
| 2003/0014448 A1 | 1/2003 | Castellanos et al. | |
| 2003/0018670 A1* | 1/2003 | Ashford | G06F 17/278 715/236 |
| 2003/0139921 A1* | 7/2003 | Byrd | G06F 17/27 704/10 |
| 2006/0184351 A1 | 8/2006 | Corston-Oliver et al. | |
| 2008/0033714 A1 | 2/2008 | Gupta | |
| 2008/0086297 A1* | 4/2008 | Li | G06F 17/28 704/3 |
| 2009/0006359 A1* | 1/2009 | Liao | G06F 17/2795 |
| 2011/0047457 A1* | 2/2011 | Flint | G06F 17/2282 715/261 |
| 2012/0084076 A1* | 4/2012 | Boguraev | G06F 17/2735 704/9 |
| 2012/0158400 A1 | 6/2012 | Schmidt et al. | |
| 2013/0090917 A1 | 4/2013 | Chalmers et al. | |
| 2013/0110500 A1* | 5/2013 | Feng | G06F 17/2282 704/9 |
| 2014/0089246 A1 | 3/2014 | Adriaansen et al. | |
| 2014/0344263 A1 | 11/2014 | Dhamdhere et al. | |
| 2015/0026194 A1 | 1/2015 | Dziedzicki | |
| 2017/0091164 A1* | 3/2017 | Bao | G06F 17/241 |
| 2017/0199963 A1* | 7/2017 | Kondadadi | G06F 19/322 |

OTHER PUBLICATIONS

Non-Final Office Action dated Mar. 22, 2017 in corresponding U.S. Appl. No. 15/195,437.

Zhang, W., Sim, Y. C. & Su, J. et al. (2011). Entity Linking with Effective Acronym Expansion, Instance Selection and Topic Modeling. Proceedings of the Twenty-Second Internat.

Chang, J. T., Schatze, H., D, H. S. P., Biosciences, N., Altman, R. B., and D, P. (2002). Creating an online dictionary of abbreviations from medline. Journal of the American.

Larkey, L. S., Ogilvie, P., Price, M. A., and Tamilio, B. (2000). Acrophile: An automated acronym extractor and server. In Proceedings of the Fifth ACM Conference on Digital L.

Nadeau, D. and Turney, P. D. (2005). A supervised learning approach to acronym identification. In Proceedings of the 18th Canadian Society Conference on Advances in Artificial.

Pustejovsky, J., Castano, J., Cochran, B., Kotecki, M., and Morrell, M. (2001). Automatic extraction of acronym-meaning pairs from medline databases. Stud Health Technol Infor.

Schwartz, A. and Hearst, M. (2003). A simple algorithm for identifying abbreviation definitions in biomedical text. In In Proceedings of Pacific Symposium on Biocomputing, vol.

Taghva, K. and Gilbreth, J. (1999). Recognizing acronyms and their definitions. ISRI (Information Science Research Institute) UNLV, 1:191-198.

Yu, H., Hripcsak, G., and Friedman, C. (2002). Mapping abbreviations to full forms in biomedical articles. Journal of the American Medical Informatics Association, 9:262-272.

Zahariev, M. (2004). A linguistic approach to extracting acronym expansions from text. Knowledge and Information Systems, 6(3):366-373.

Final Office Action dated Sep. 22, 2017 in corresponding U.S. Appl. No. 15/195,437.

Dahl, et al., "Context-Dependent Pre-Trained Deep Neural Networks for Large-Vocabulary Speech Recognition," IEEE Transactions on Audio, Speech, and Language Processing, Jan. 2012.

Non-Final Office Action dated May 21, 2018 in corresponding U.S. Appl. No. 15/195,437.

* cited by examiner

HYBRID APPROACH FOR SHORT FORM DETECTION AND EXPANSION TO LONG FORMS

TECHNICAL FIELD

The present application relates generally to a system and method that can be used to detect short forms and their corresponding long forms independently of language constraints.

BACKGROUND

A short form is a word that is usually formed by combining some select characters from a long form term, while ignoring the long form's other characters. Typical short forms include acronyms, abbreviations, and initialisms. For example, IBM is a short form of the term "International Business Machines," of which the latter is IBM's corresponding long form. Long forms can typically have one or more words. Prior art approaches for the detection of short forms and expansion to their respective long forms have been constrained by language specific rules, which limit their ability to be implemented in systems that are implemented in multi-lingual environments. More efficient, language-independent short form detection and long form expansion is beneficial, as the product short forms and their corresponding long forms can be used for, among other things, query expansion and to improve search results, search indexing, terminology extraction, and ontology population.

SUMMARY

Embodiments can provide a computer implemented method, in a data processing system comprising a processor and a memory comprising instructions which are executed by the processor to cause the processor to implement a short form/long form detection system, the method comprising ingesting a corpus comprising one or more documents; splitting the one or more documents into one or more tokens; selecting one or more tokens as one or more candidate short forms; for each candidate short form, generating one or more n-gram combinations, resulting in one or more candidate short form and n-gram combination pairs; for each candidate short form and n-gram combination pair; calculating an approximate string matching distance; calculating a best possible alignment score; calculating a confidence score; calculating a topic similarity score; and calculating a semantic similarity score; determining the validity, through a meta learner, of each candidate short form and n-gram combination pair based upon each short form and n-gram combination pair's confidence score, topic similarity score, and semantic similarity score; and if valid, storing the short form and n-gram combination pair in a repository.

Embodiments can further provide a method further comprising generating n-gram combinations based upon a predetermined window of tokens located around a position in the document where the candidate short form appears.

Embodiments can further provide a method further comprising checking the validity of each n-gram combination's first token and last token against one or more part of speech tags.

Embodiments can further provide a method further comprising calculating the approximate string matching distance with and without considering prepositions.

Embodiments can further provide a method further comprising calculating the confidence score based on the approximate string matching distance, and a number of times the short form and n-gram combination pair is found within the corpus.

Embodiments can further provide a method further comprising for each candidate short form and n-gram combination pair, measuring a proximity between the candidate short form and the n-gram combination; and calculating the confidence score based on the proximity.

Embodiments can further provide a method further comprising for each candidate short form and n-gram combination pair, determining if the pair meet one or more threshold criteria; and disregarding one or more candidate short form and n-gram combination pairs that fail to meet the threshold criteria.

Embodiments can further provide a method further comprising generating a latent semantic analysis model; and calculating the topic similarity score based on the latent semantic analysis model.

Embodiments can further provide a method further comprising generating a deep learning model; and calculating the semantic similarity score based on the deep learning model.

Embodiments can further provide a method further comprising calculating the best possible alignment score using a string match scoring algorithm based on a maximum pooling over one or more possible alignments between the candidate short form and n-gram combination.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a short form/long form detection processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
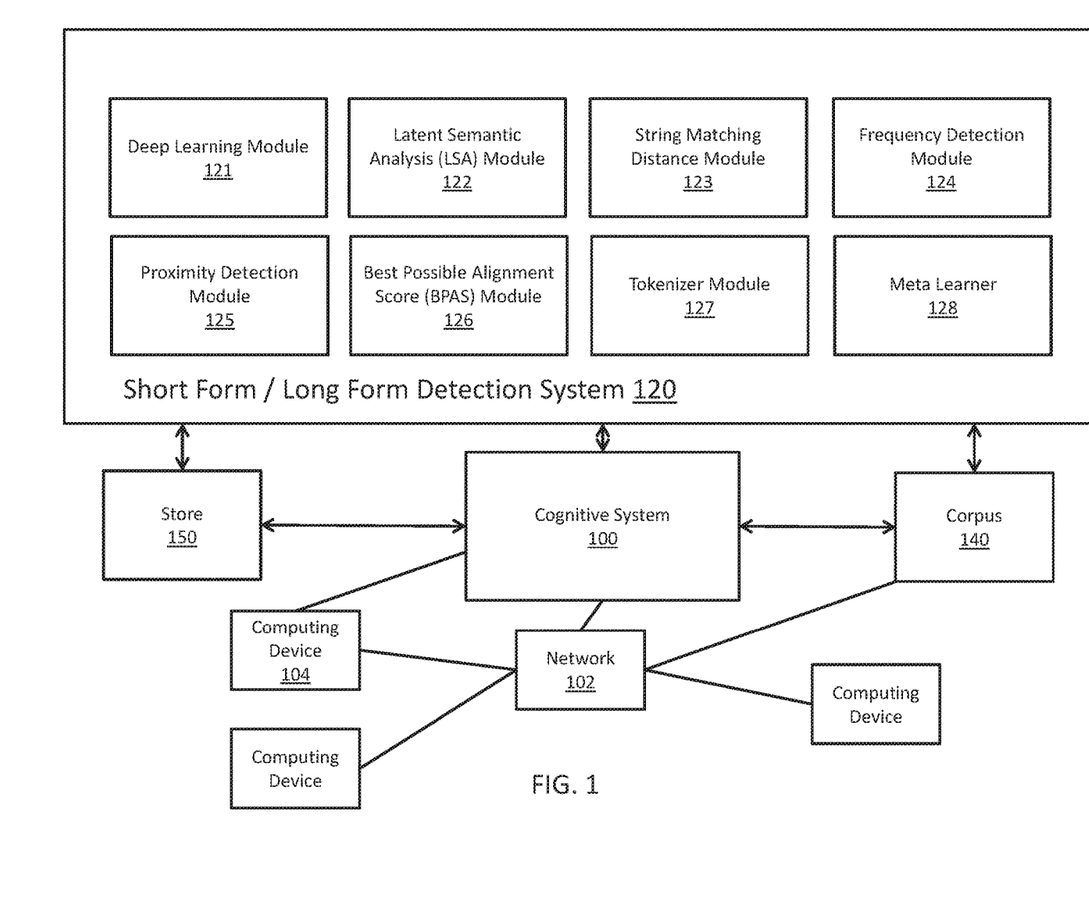
FIG. 1 depicts a schematic diagram of one illustrative embodiment of a cognitive system implementing a short form/long form detection system in a computer network.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

1. Navigate the complexities of human language and understanding
2. Ingest and process vast amounts of structured and unstructured data
3. Generate and evaluate hypotheses
4. Weigh and evaluate responses that are based only on relevant evidence
5. Provide situation-specific advice, insights, and guidance
6. Improve knowledge and learn with each iteration and interaction through machine learning processes
7. Enable decision making at the point of impact (contextual guidance)
8. Scale in proportion to the task
9. Extend and magnify human expertise and cognition
10. Identify resonating, human-like attributes and traits from natural language
11. Deduce various language specific or agnostic attributes from natural language
12. High degree of relevant recollection from data points (images, text, voice) (memorization and recall)
13. Predict and sense with situation awareness that mimic human cognition based on experiences
14. Answer questions based on natural language and specific evidence FIG. 1 depicts a schematic diagram of one illustrative embodiment of a cognitive system 100 implementing a short form/long form detection system 120 in a computer network 102. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables short form/long form detection functionality for one or more cognitive system users via their respective computing devices. Other embodiments of the cognitive system 100 may be used with components, systems, subsystems, and/or devices other than those that are depicted herein.

The cognitive system 100 is configured to implement a short form/long form detector 120 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and short form/long form detection system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet. In one embodiment, the content creator creates content in a document of the corpus of data 140 for use as part of a corpus of data with the cognitive system 100. The document includes any file, text, article, or source of data for use in the cognitive system 100. In some illustrative embodiments, the cognitive system 100 may be the IBM Watson™ cognitive system available from International Business Machines Corporation of Armonk, N.Y., which is augmented with the mechanisms of the illustrative embodiments described hereafter.

As shown in FIG. 1, in accordance with some illustrative embodiments, the cognitive systems 100 is further augmented, in accordance with the mechanisms of the illustrative embodiments, to include logic implemented in specialized hardware, software executed on hardware, or any combination of specialized hardware and software executed on hardware, for implementing a short form/long form detection system 120. The operation of the short form/long form detection system 120 may be initiated in response to additional materials being added to the corpus 140 of documents from which the cognitive system 100 interacts with. Alternately, the operation of the short form/long form detection system 120 may be initiated at the behest of a user, or at prescheduled intervals.

According to illustrative embodiments described further herein, the short form/long form detection system 120 can exploit deep learning models and distributional semantics, and can use a novel string match scoring algorithm based on max pooling, termed the best possible alignment score (BPAS). The detection system 120 can be used for multiple languages, and is effective independently of whether the particular language is case-sensitive. The detection system 120 is not bound to any particular language-specific rule or pattern, and does not require usage of metaphone variants separately, which can be a key constraint to avoid language dependency. The detection system 120 can exploit word statistics to filter incorrect acronyms and expansions, and does not require the use of any pre-defined stop word lists. The detection system 120 does not require complex text processing (including full syntactic parsing, semantic parsing, noun phrase chunking, named entity recognition or sentence splitting), but these processing techniques could be incorporated into alternate embodiments of the detection system 120. As will be described, the detection system 120 can provide one or more long form expansions per short form, which can be ranked by confidence scores. In an embodiment, evidence for the long form expansion of the particular short form can be provided as an output of the detection system 120. The scope of pairings for the short and long forms can occur on a document level, or at a corpus level.

Figure 2:
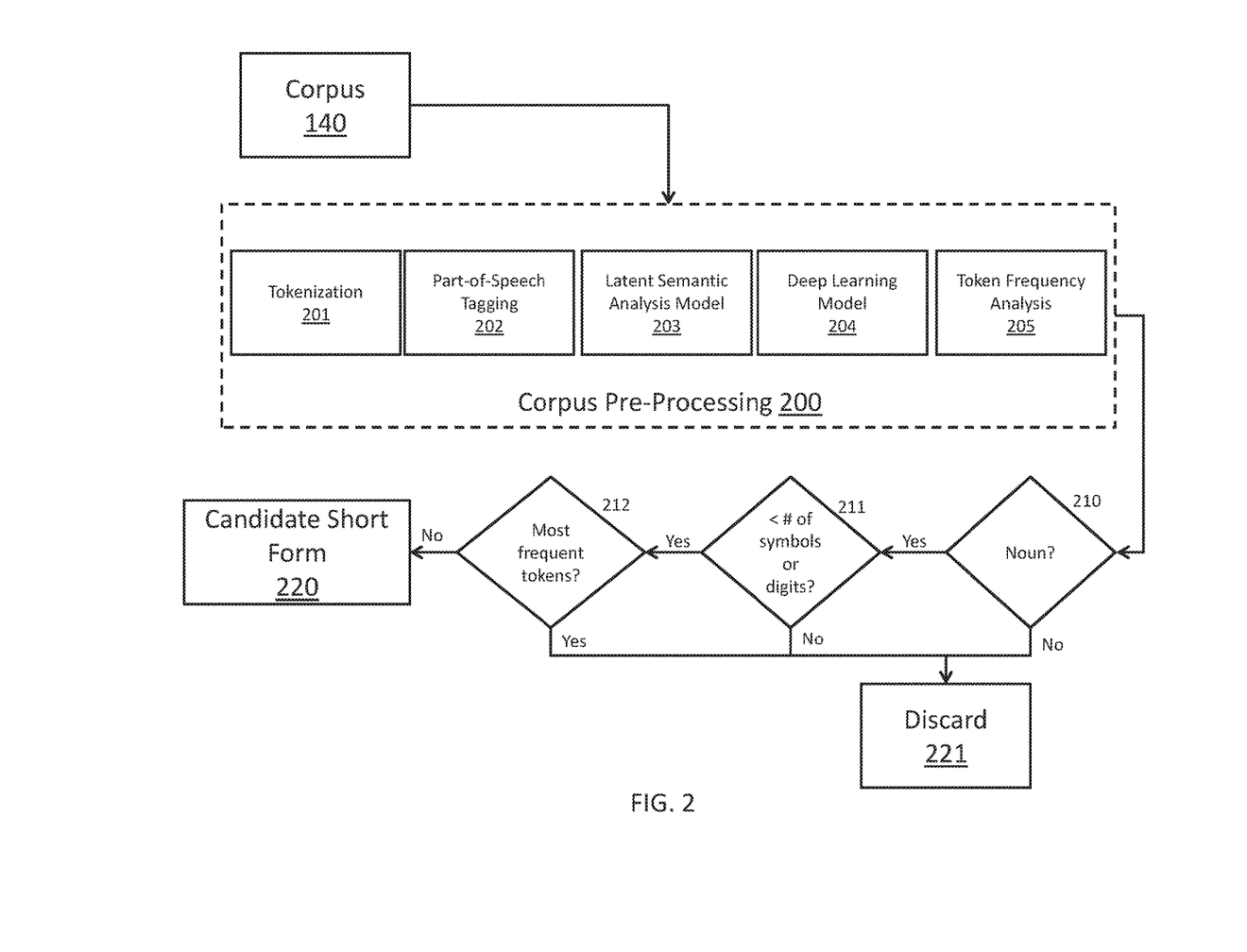
FIG. 2 depicts a block diagram illustrating an illustrative embodiment of short form detection by the short form/long form detection system, as described herein.

FIG. 2 depicts a sample flow diagram illustrating short form candidate 220 generation, according to illustrative embodiments described herein. Given a new corpus 140 of documents, the first action that can be taken by the short form/long form detection system 120 can be to pre-process 200 the corpus 140. Pre-processing can involve tokenization 201 and part-of-speech (POS) tagging 202. In natural language processing, the process of tokenization 201 can involve splitting text into linguistic units known as tokens. POS tagging 202 involves a linguistic analysis of each token based on its definition and context, in order to assign a part of speech (verb, noun, adjective, etc.) to the particular token. Tokenization and part-of-speech tagging can be accomplished by a tokenizer 127 (as shown in FIG. 1). In an embodiment, the tokenizer 127 can be IBM's LanguageWare™ tool. In alternate embodiments, an alternate tokenizer can be used.

Post-tokenization 201 and POS tagging 202, the corpus 140 can undergo latent semantic analysis (LSA) in order to create a LSA model 203. LSA can be a technique in natural language processing of analyzing relationships between a set of documents and the terms they contain by producing a set of concepts related to the documents and terms, and can assume that words close in meaning will occur in similar pieces of text. The LSA model 203 can be generated by the LSA module 122 (as shown in FIG. 1). In addition to the LSA model 203, a deep learning model 204 can be generated. The deep learning model 204 can be generated by the deep learning module 121 (as shown in FIG. 1). In an embodiment, the deep learning model 204 can be generated using a neural network concept. In alternate embodiments, alternate machine learning concepts can be used to generate the deep learning model 204. Lastly, pre-processing 200 the corpus 140 can involve analyzing and collecting the token frequencies 205 as they appear in the corpus 140 using a frequency detection module 124 (as shown in FIG. 1).

To generate the candidate short forms 220, the short form/long form detection system can, for each document in the corpus 140, filter the tokens through a variety of semantic criteria. The system can first filter and discard 221 all tokens that are not nouns 210. Second, the system can filter and discard 221 tokens that have more than a pre-determined number of symbols and/or digits 211. In an embodiment, the maximum number of symbols or digits allowed can be one. In an embodiment, the minimum character length of a candidate short form 220 can be at least two characters. Lastly, the system can filter and discard 221 any tokens belonging to a pre-determined percentage of the most frequently appearing tokens 212 appearing in the corpus 140, as these tokens may have a high likelihood of being functional or stop words. In an embodiment, tokens belonging to the 0.5% most frequent tokens can be excluded. After passing through the three filters, all remaining tokens can be considered as potential short form candidates 220. Alternate embodiments can perform the filtration steps listed above in alternate order, in conjunction, or in any combination.

Advantages of the present short form detection system include the lack of need for a usage of pattern. For example, prior art systems make assumptions that either the short form or corresponding long form must appear inside parentheses. The present system makes no such assumptions. The present system can detect short forms independent of capitalization. However, if one or more documents in the corpus 140 are written in a case-sensitive language (which can be automatically detected by the system), the case-sensitive property of the particular language can also be exploited for pruning discards 221 and increasing efficiencies. In an embodiment involving a case specific language, an additional filter can discard 221 tokens that lack at least one uppercase letter.

Figure 3:
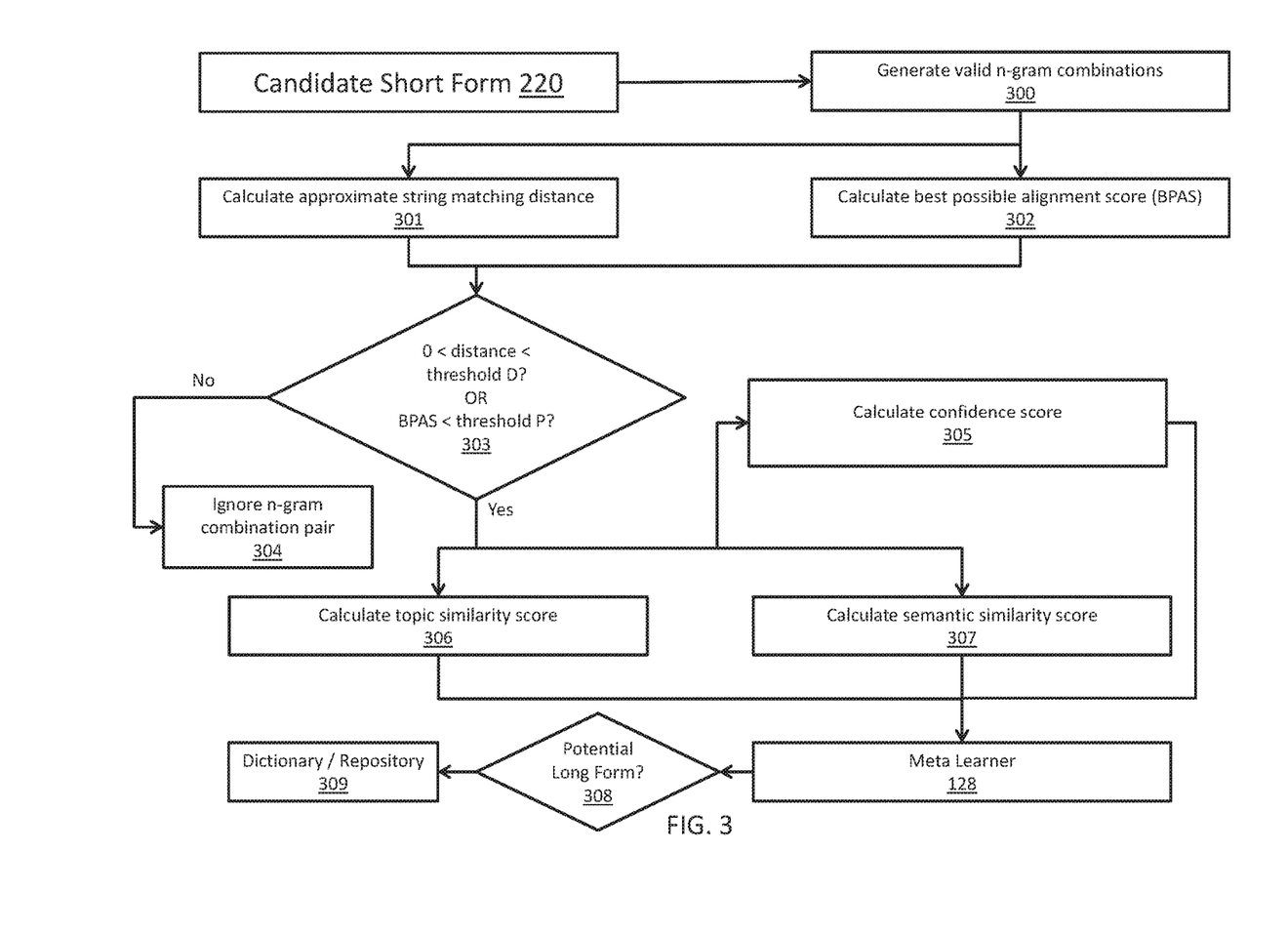
FIG. 3 depicts a block diagram illustrating an illustrative embodiment of long form detection by the short form/long form detection system, as described herein.

FIG. 3 depicts a sample flow diagram illustrating long form candidate generation, according to illustrative embodiments described herein. For every candidate short form 220 generated (as described in FIG. 2), the detection system can first generate one or more valid n-gram combinations 300. N-gram combinations can be contiguous sequences of n items from a given sequence of text or speech, and can include base pairs, words, syllables, or, in an embodiment, tokens. In an embodiment, the n-gram combinations can be generated using the document text. The validity of the n-gram combinations can be ensured by checking the POS tags and token frequency of the first and last tokens included in a particular combination. In an embodiment, an invalid combination can be defined as a combination wherein the first and/or last token in the combination has a POS tag delineating a preposition. In an embodiment, the n-gram combinations can be generated within a certain window of tokens around the position in the document where the candidate short form appears, which can reduce the search space.

After generating valid n-gram combinations 300 for the candidate short form 220, the detection system can then perform two analyses on each n-gram combination: calculate the approximate string matching distance 301 using a string matching distance module 123 (as shown in FIG. 1) and calculate the best possible alignment score 302 using a best possible alignment score module 126 (as shown in FIG. 1). In an embodiment, the approximate string matching distance (which can also be referred to as the surface similarity), can be calculated by applying a string matching distance algorithm twice: on one pass ignoring prepositions inside the long form candidate, and on the other not ignoring prepositions.

The approximate string matching distance calculation algorithm can begin by defining an array of tokens of the candidate long form and an array of characters from the candidate short form 220. Also defined is an initial zero value for a number of matches and a number of skipped tokens. Beginning a loop, for a particular member of the array of tokens and a particular character of the candidate short form, if the particular token member is a determiner or a conjunction, move to the next token and increase the value of the number of skipped tokens monotonically. Otherwise, if the particular token member is a symbol and the corresponding short form character is not a symbol, move to the next token and increase the value of skipped tokens monotonically. Otherwise, if the first character of the particular token member matches with the corresponding short form character, increase the value for the number of matches monotonically and move to the next short form character. After each combination of token member and short form character has been compared, the loop can end.

After the last token member has been analyzed, if the number of matched characters is greater than zero, and less than the length of short form characters, then the detection system can check if all of the characters in the array of short form characters exist in the order of their appearances (though they do not have to appear consecutively) within the array of tokens. If the check returns true or if the number of matched characters is equal to the length of short form characters, the approximate string matching distance can be calculated as the absolute value of the total number of token members, minus the number of skipped tokens, minus the number of matches, and can be returned for each candidate pair of short form and long form.

Apart from calculating the approximate string matching distance 301, the detection system concurrently can use a string match scoring algorithm that can be based on the maximum pooling over possible alignments. This string match scoring can be referred to as calculating the best possible alignment score (BPAS) 302. In this context, an alignment can be a mapping from each character in the candidate short form 220 to a single matching character in an individual n-gram combination, or in some instances to no match. For example, a candidate short form "EDT" could be aligned to Eastern Daylight, Eastern Daylight, or to Eastern Daylight Savings Time.

Each alignment can be scored according to features of the alignment. Features of the alignment can include, but are not limited to, the number of unmatched characters, the number of characters that map to the start of a word in the n-gram combination, the number of characters the match out of order, whether the first character in the n-gram combination is matched, and the number of words in the n-gram combination with no match. The weights for these features can be trained by back propagation through the max pool. The detection system can learn to score candidate short form and n-gram combination pairs according to the best possible alignment.

Once the n-gram combination's approximate string matching distance 301 and BPAS 302 is calculated, the detection system can evaluate the n-gram combination to determine if it meets threshold criteria 303. In an embodiment, if any of the approximate string matching distances (obtained with and without considering prepositions) are between zero and a pre-determined threshold D, or if the BPAS is less than a pre-determined threshold P, the candidate short form 220 and n-gram combination pair can be considered for further scoring. If the n-gram combination/short form pair fails the threshold test 303, the n-gram combination/short form pair is ignored 304.

N-gram combination/short form pairs that pass the threshold test 303 can have a confidence score calculated 305. The confidence score can be calculated through the use of an algorithm that can take into consideration the approximate string matching distance, the shortest number of characters between the short form candidate and the n-gram combination in the document, and the number of times the n-gram combination/short form pair has been seen within a certain maximum token distance inside the given corpus. In an embodiment, the higher the number of times the pair is seen within the corpus, the higher the confidence score. The shortest number of characters between the short form candidate and the n-gram combination can be determined by the proximity detection module 125 (as shown in FIG. 1).

Additionally, a topic similarity score for the n-gram combination/short form pair can be calculated 306. The topic similarity score can be calculated using the LSA model developed during short form detection. Lastly, a semantic similarity score for the pair can be calculated 307. The semantic similarity score can be calculated using the deep learning model, which can be based on a neural network machine learning model, developed during short form detection. The confidence score, topic similarity score, and semantic similarity score can be combined in a meta learner 128 to determine if the n-gram combination/short form pair is valid 308. If so, the pair is recorded/stored in a dictionary/repository 309. The valid n-gram combination/short form pairs can also be output by the detection system in a format visible to a user.

Figure 4:
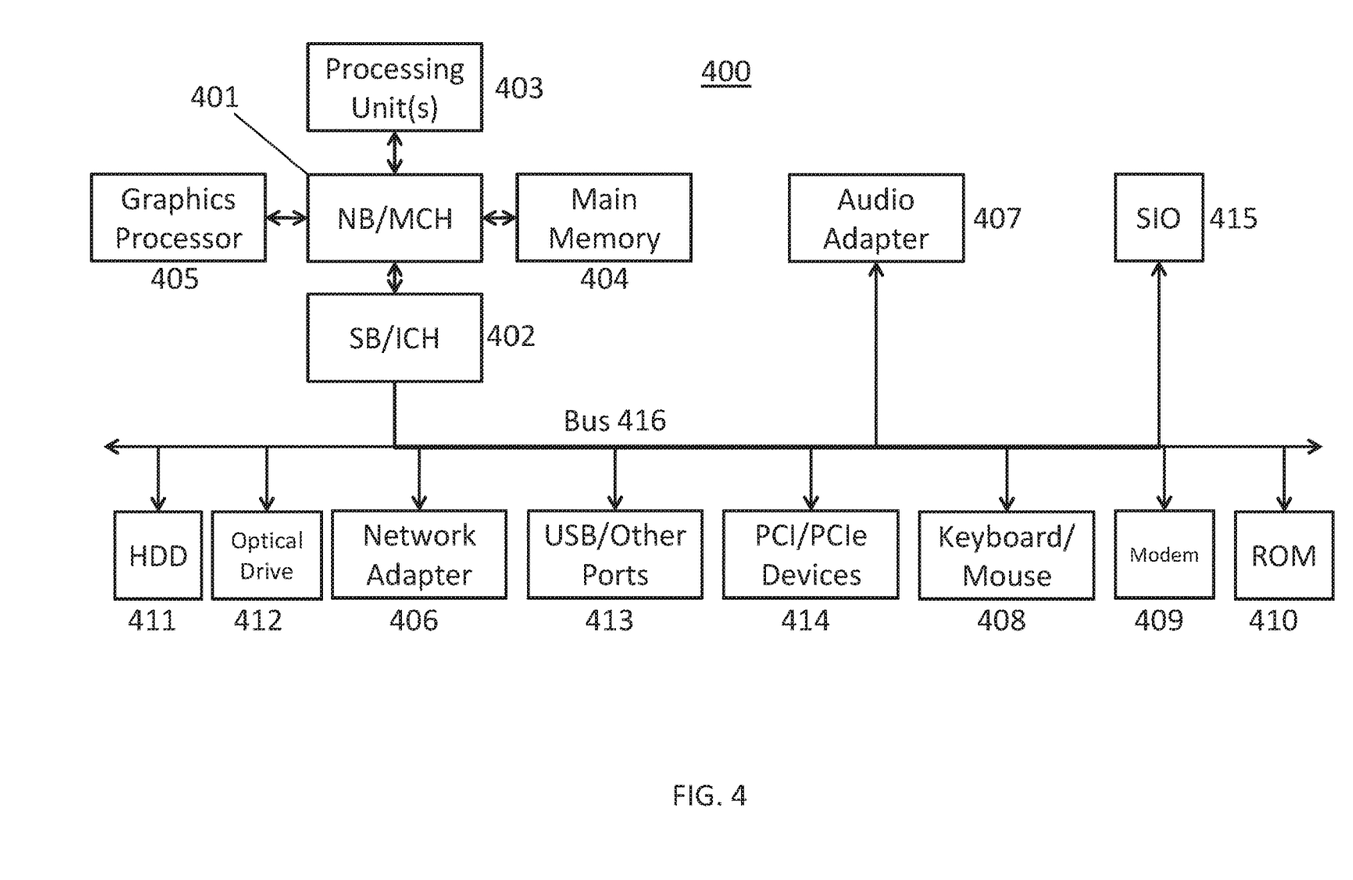
FIG. 4 is a block diagram of an example data processing system in which aspects of the illustrative embodiments are implemented.

FIG. 4 is a block diagram of an example data processing system 400 in which aspects of the illustrative embodiments are implemented. Data processing system 400 is an example of a computer, such as a server or client, in which computer usable code or instructions implementing the process for illustrative embodiments of the present invention are located. In one embodiment, FIG. 4 represents a server computing device, such as a server, which implements the short form/long form detection system 120 and cognitive system 100 described herein.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System P® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the short form/long form detection system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method, in a data processing system comprising a processor and a memory comprising instructions which are executed by the processor to cause the processor to implement a short form/long form detection system, the method comprising:
    ingesting a corpus comprising one or more documents;
    splitting the one or more documents into one or more tokens;
    selecting one or more tokens as one or more candidate short forms;
    for each candidate short form, generating one or more n-gram combinations, resulting in one or more candidate short form and n-gram combination pairs;
    for each candidate short form and n-gram combination pair;
        calculating an approximate string matching distance;
        calculating a best possible alignment score using a string matching scoring algorithm based on a maximum pooling over one or more possible alignments between the candidate short form and n-gram combination;
        evaluating the n-gram combination to determine if the approximate string matching distance meets a first pre-determined threshold or the best possible alignment score meets a second pre-determined threshold;
        if the n-gram combination meets either the first pre-determined threshold or the second pre-determined threshold, then;
            calculating a confidence score based on the approximate string matching distance;
            calculating a topic similarity score; and
            calculating a semantic similarity score;
    determining the validity, through a meta learner, of each candidate short form and n-gram combination pair based upon each short form and n-gram combination pair's confidence score, topic similarity score, and semantic similarity score; and
    if valid, storing the short form and n-gram combination pair in a repository.

2. The method as recited in claim 1, further comprising:
    generating n-gram combinations based upon a pre-determined window of tokens located around a position in the document where the candidate short form appears.

3. The method as recited in claim 1, further comprising:
    checking the validity of each n-gram combination's first token and last token against one or more part of speech tags.

4. The method as recited in claim 1, further comprising:
    calculating the approximate string matching distance with and without considering prepositions.

5. The method as recited in claim 1, further comprising:
    calculating the confidence score based on a number of times the short form and n-gram combination pair is found within the corpus.

6. The method as recited in claim 5, further comprising:
    for each candidate short form and n-gram combination pair, measuring a proximity between the candidate short form and the n-gram combination; and
    calculating the confidence score based on the proximity.

7. The method as recited in claim 1, further comprising:
    disregarding one or more candidate short form and n-gram combination pairs that fail to meet the first pre-determined threshold and the second pre-determined threshold.

8. The method as recited in claim 1, further comprising:
    generating a latent semantic analysis model; and
    calculating the topic similarity score based on the latent semantic analysis model.

9. The method as recited in claim 1, further comprising:
    generating a deep learning model; and calculating the semantic similarity score based on the deep leaning model.

10. A computer program product for short form/long form detection, the computer program product comprising a computer readable storage medium having program instructions embodied therewith, the program instructions executable by a processor to cause the processor to:
ingest a corpus comprising one or more documents;
split the one or more documents into one or more tokens;
select one or more tokens as one or more candidate short forms;
for each candidate short form, generate one or more n-gram combinations, resulting in one or more candidate short form and n-gram combination pairs;
for each candidate short form and n-gram combination pair;
calculate an approximate string matching distance;
calculate a best possible alignment score using a string matching scoring algorithm based on a maximum pooling over one or more possible alignments between the candidate short form and n-gram combination;
evaluating the n-gram combination to determine if the approximate string matching distance meets a first pre-determined threshold or the best possible alignment score meets a second pre-determined threshold;
if the n-gram combination meets either the first pre-determined threshold or the second pre-determined threshold, then;
calculate a confidence score;
calculate a topic similarity score; and
calculate a semantic similarity score;
determine the validity, through a meta learner, of each candidate short form and n-gram combination pair based upon each short form and n-gram combination pair's confidence score, topic similarity score, and semantic similarity score; and
if valid, store the short form and n-gram combination pair in a repository.

11. The computer program product as recited in claim 10, the processor further configured to:
generate n-gram combinations based upon a pre-determined window of tokens located around a position in the document where the candidate short form appears.

12. The computer program product as recited in claim 10, the processor further configured to:
check the validity of each n-gram combination's first token and last token against one or more part of speech tags.

13. The computer program product as recited in claim 10, the processor further configured to:
calculate the approximate string matching distance with and without considering prepositions.

14. The computer program product as recited in claim 10, the processor further configured to:
calculate the confidence score based on the approximate string matching distance and a number of times the short form and n-gram combination pair is found within the corpus.

15. The computer program product as recited in claim 14, the processor further configured to:
for each candidate short form and n-gram combination pair, measure a proximity between the candidate short form and the n-gram combination; and
calculate the confidence score based on the proximity.

16. The computer program product as recited in claim 10, the processor further configured to:
disregard one or more candidate short form and n-gram combination pairs that fail to meet the first pre-determined threshold criteria and the second pre-determined threshold.

17. The computer program product as recited in claim 10, the processor further configured to:
generate a latent semantic analysis model; and
calculate the topic similarity score based on the latent semantic analysis model.

18. The computer program product as recited in claim 10, the processor further configured to:
generate a deep learning model; and
calculate the semantic similarity score based on the deep learning model.

19. A system for short form/long form detection, comprising:
a short form/long form detection processor configured to:
ingest a corpus comprising one or more documents;
split the one or more documents into one or more tokens;
select one or more tokens as one or more candidate short forms;
for each candidate short form, generate one or more n-gram combinations, resulting in one or more candidate short form and n-gram combination pairs;
for each candidate short form and n-gram combination pair;
calculate an approximate string matching distance;
calculate a best possible alignment score using a string matching scoring algorithm based on a maximum pooling over one or more possible alignments between the candidate short form and n-gram combination;
evaluating the n-gram combination to determine if the approximate string matching distance meets a first pre-determined threshold or the best possible alignment score meets a second pre-determined threshold;
if the n-gram combination meets either the first pre-determined threshold or the second pre-determined threshold, then;
calculate a confidence score;
calculate a topic similarity score; and
calculate a semantic similarity score;
determine the validity, through a meta learner, of each candidate short form and n-gram combination pair based upon each short form and n-gram combination pair's confidence score, topic similarity score, and semantic similarity score; and
if valid, store the short form and n-gram combination pair in a repository.

* * * * *